No. 856,940. PATENTED JUNE 11, 1907.
J. P. CADY.
LAWN TRIMMING MACHINE.
APPLICATION FILED FEB. 20, 1907.
2 SHEETS—SHEET 2.
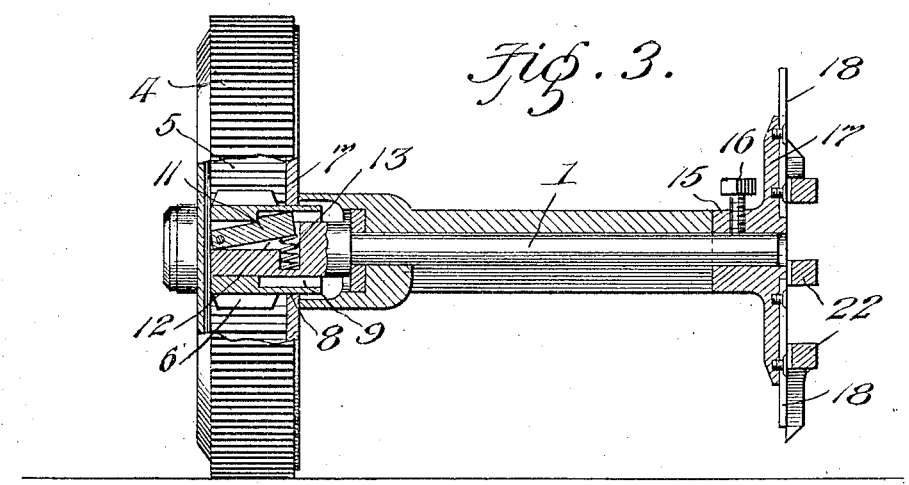
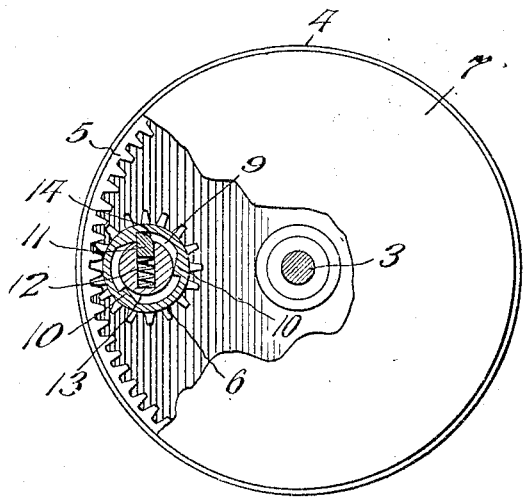
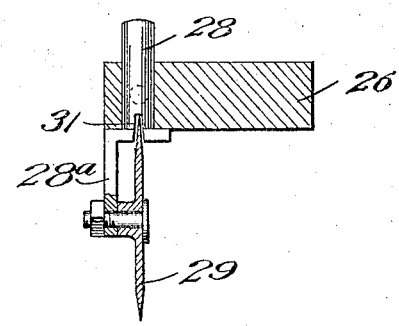
Inventor
John P. Cady
By Victor J. Evans
Attorney
Witnesses
Frank B. Hoffman
Wm. Ragger

UNITED STATES PATENT OFFICE.

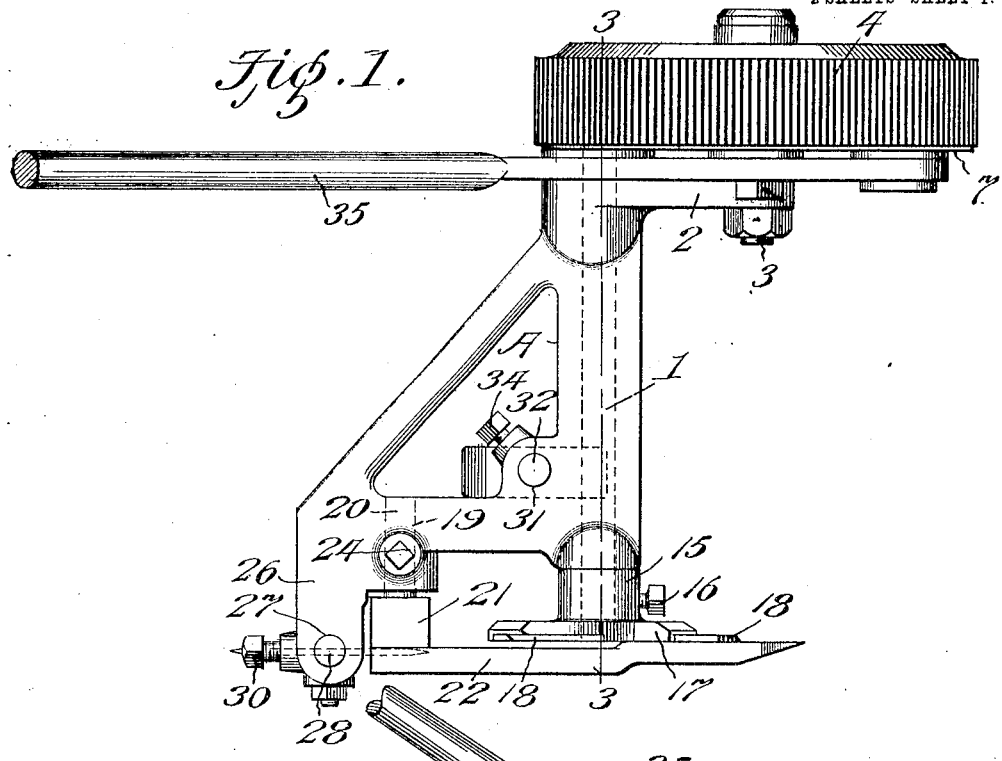
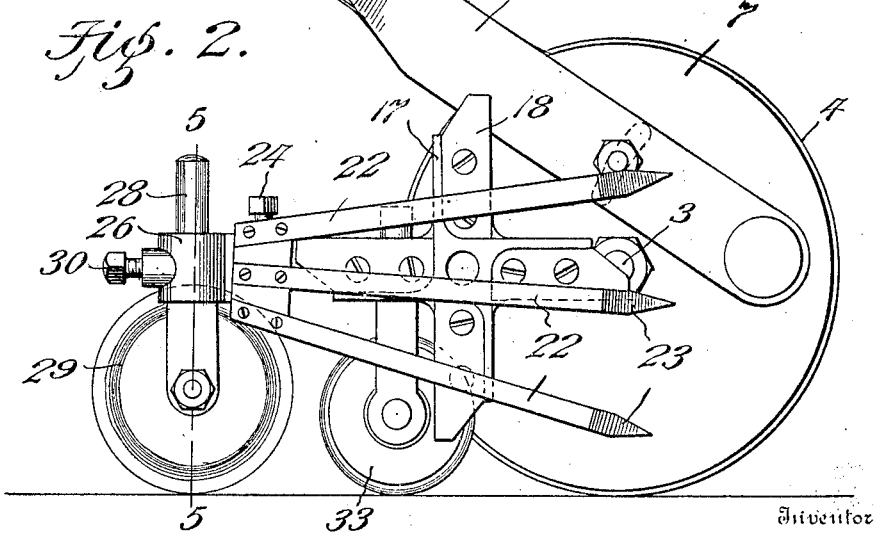

JOHN P. CADY, OF SAN ANTONIO, TEXAS.

LAWN-TRIMMING MACHINE.

No. 856,940.  Specification of Letters Patent.  Patented June 11, 1907.

Application filed February 20, 1907. Serial No. 358,383.

*To all whom it may concern:*

Be it known that I, JOHN P. CADY, a citizen of the United States, residing at San Antonio, in the county of Bexar and State of Texas, have invented new and useful Improvements in Lawn-Trimming Machines, of which the following is a specification.

This invention relates to machines for trimming the edges of lawns or grass plots which cannot be readily trimmed by the use of the automatic lawn mower without exposing the latter to injury by causing the blades to come into contact with the soil and gravel; and the invention has for its object to provide a machine of this class which shall possess superior advantages in point of simplicity, durability and general efficiency.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawings, Figure 1 is a top plan view of a lawn trimming machine constructed in accordance with the principles of the invention. Fig. 2 is a side elevation of the same. Fig. 3 is a vertical transverse sectional view taken on the plane indicated by the line 3—3 in Fig. 1. Fig. 4 is a side elevation, partly in section, of the driving wheel, showing the clutch mechanism for driving the cutter carrying shaft of the machine. Fig. 5 is a sectional detail view taken on the plane indicated by the line 5—5 in Fig. 2.

Corresponding parts in the several figures are denoted by like characters of reference.

The frame of the machine consists of an approximately triangular casting A having bearings for the transversely disposed cutter carrying shaft 1. The frame is provided at one side with a forward extending lug 2 supporting a bolt or pin 3 upon which the drive wheel 4 is supported for rotation; said drive wheel having a transversely corrugated rim as clearly shown in Fig. 1. The drive wheel is provided with an internal gear 5 meshing with a pinion 6 upon the cutter carrying shaft 1, one end of which extends within the drive wheel through a casing plate 7 which is supported upon the pin or bolt 3 and has an aperture 8 for the passage of the cutter carrying shaft. The casing plate 7 serves to prevent the passage of sand and dirt into the casing formed by the drive wheel where it would be liable to interfere with the operation of the machine.

The pinion 6, which loosely engages the cutter carrying shaft, is provided with a recess 9 having interiorly disposed ratchet teeth 10 adapted to be engaged by a pawl 11 that is seated in a transverse recess 12 in the cutter carrying shaft which is forced in an outward direction by means of a spring 13; said pawl being provided with a beveled edge 14 enabling it to slip by the ratchet teeth 10 when the drive wheel is rotated backward; when the drive wheel is rotated forwardly, by the propulsion of the machine in a forward direction, the pinion 6 will be rotated by the internal gear 5, and one of the ratchet teeth 10 will engage the spring actuated pawl 11, thus positively rotating the cutter carrying shaft.

The end of the shaft 1, opposite to the drive wheel, projects at one side of the frame A, and carries a hub 15 secured by a set screw 16 and having a plurality of radial arms 17 carrying blades or cutters 18. The frame A is provided with a slot or recess 19 in which is secured a stem 20 having a head 21 provided with a plurality of fingers 22 disposed in an approximately vertical plane, and diverging forwardly as will be clearly seen by reference to Fig. 2 of the drawings, said fingers having terminal points 23. The stem 19 is secured adjustably by means of a set screw 24, enabling the fingers to be accurately adjusted in such a manner as to contact lightly with the faces of the blades or cutters 18, which latter will operate conjointly with the fingers 22 to effect a shearing cut. By the construction described, the blades or cutters will be what is known as self-sharpening, since the friction of the faces of said blades against the inner faces of the fingers will tend to sharpen the edges of the blades, as will be readily understood; wear upon the blades of the fingers may be compensated for by properly adjusting the stem 19 carrying the fingers.

The frame A is provided in rear of the finger carrying stem with a laterally extending lug 26 having a vertical aperture 27 wherein is fitted a shank 28 having at its lower end a laterally offset lug 28ª upon which is journaled a sharp edged disk 29 constituting an auxiliary cutter which is intended and adapted to penetrate slightly into the soil for the purpose of trimming that portion of the grass which is not reached by the rotary cutters, and more particularly for the purpose of trimming the roots of the grass at the edge of the lawn or plot. The cutter carrying shank 28 is held in position adjustably by means of a set screw 30, and said shank is provided with a recess or notch 31 through which the edge of the cutter is compelled to pass as will be best seen in Fig. 5 of the drawings; the object of this construction being to keep the edge of the cutter disk clear from clay and other obstructions which might have a tendency to adhere thereto.

The body of the frame A has an aperture 31 wherein is fitted a shank 32 carrying a caster wheel 33 which is disposed intermediate of the drive wheel 4 and the cutting apparatus, which latter will thus be supported at the desired elevation above the ground, which may be regulated by properly adjusting the shank 32; the latter being secured by means of a set screw 34.

A handle bar 35 whereby the machine may be conveniently manipulated, is bolted or otherwise suitably secured upon the casing plate 7.

From the foregoing description taken in connection with the drawings hereto annexed, the operation and advantages of this invention will be readily understood.

The machine is light, inexpensive in construction, and it may be very conveniently operated for the purpose of trimming the edges of lawns, beds and plots which cannot be conveniently reached by lawn mowing machines of the ordinary construction.

Having thus fully described the invention, what I claim as new is:—

1. In a lawn trimming machine a frame having a forwardly extending lug, a shaft journaled transversely in the frame, a drive wheel supported for rotation by the forwardly extending lug and having an internal gear, a pinion upon the end of the transverse shaft that projects within the drive wheel, clutch means for connecting said pinion with the shaft, a hub upon the opposite end of the shaft having radially extending cutter carrying arms, a stem laterally adjustable in the frame and provided with a head, and a plurality of forwardly divergent fingers upon said head, said fingers being disposed in an approximately vertical plane adjacent to the cutter carrying hub.

2. In a lawn trimming machine, a frame, a transversely disposed driven cutter carrying shaft, a transversely adjustable member carrying a plurality of divergent fingers disposed in an approximately vertical plane and co-operating with the cutters carried by the shaft, an auxiliary rotary sharp edged cutter disk supported in rear of the fingers and approximately in the same vertical plane.

3. In a lawn trimming machine, a frame having a forwardly extending lug, a drive wheel supported for rotation upon said lug, a shaft journaled transversely in the frame and extending within the drive wheel, a pinion upon the shaft meshing with an internal gear upon the drive wheel, clutch mechanism connecting the pinion with the shaft, a cutter carrying hub upon the opposite end of the shaft adjacent to the frame, a member transversely adjustable upon the frame, a plurality of divergent fingers carried by said members and co-operating with the cutter upon the shaft, a vertically adjustable shank carried by the frame intermediate the connecting mechanism and the drive wheel, and a supporting wheel carried by said shank.

In testimony whereof, I affix my signature in presence of two witnesses.

JOHN P. CADY.

Witnesses:
E. WOLFF,
JOHN J. COSTIGAN.